(12) United States Patent
Kamiyama

(10) Patent No.: US 6,929,846 B2
(45) Date of Patent: Aug. 16, 2005

(54) DECORATIVE SHEET

(75) Inventor: Kehju Kamiyama, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/474,154

(22) PCT Filed: Mar. 21, 2002

(86) PCT No.: PCT/US02/08743

§ 371 (c)(1), (2), (4) Date: Oct. 1, 2003

(87) PCT Pub. No.: WO02/081231

PCT Pub. Date: Oct. 17, 2002

(65) Prior Publication Data

US 2004/0137249 A1 Jul. 15, 2004

(30) Foreign Application Priority Data

Apr. 4, 2001 (JP) .......................... 2001-105772

(51) Int. Cl.$^7$ .............................. B32B 7/04; B32B 7/06; B32B 27/08; B32B 27/18; B32B 27/36

(52) U.S. Cl. ........................ 428/195; 428/201; 428/202; 428/203; 428/204; 428/212; 428/213; 428/215; 428/339; 428/343; 428/354; 428/480; 428/914; 524/366

(58) Field of Search ................................ 428/212, 213, 428/332, 480, 195, 201, 202, 203, 204, 215, 339, 343, 354, 914; 524/366

(56) References Cited

U.S. PATENT DOCUMENTS

| | | | | |
|---|---|---|---|---|
| 5,026,448 A | * | 6/1991 | Reafler et al. ............... 156/212 |
| 5,916,643 A | * | 6/1999 | Spain et al. ................... 428/31 |
| 5,919,537 A | * | 7/1999 | Niazy ......................... 428/40.1 |
| 5,998,028 A | * | 12/1999 | Eckart et al. ................ 428/383 |
| 6,025,069 A | * | 2/2000 | Eckart et al. ................ 428/339 |
| 6,103,328 A | * | 8/2000 | Niazy ......................... 428/40.1 |
| 6,146,485 A | * | 11/2000 | Iacono et al. ................ 156/230 |
| 6,206,998 B1 | * | 3/2001 | Niazy ......................... 156/243 |
| 6,387,472 B1 | | 5/2002 | Reck et al. |
| 6,494,982 B1 | * | 12/2002 | Muller et al. ............. 156/306.6 |
| 6,613,411 B2 | * | 9/2003 | Kollaja et al. ............. 428/40.1 |
| 6,617,008 B1 | * | 9/2003 | Kono et al. ................. 428/201 |

FOREIGN PATENT DOCUMENTS

| | | |
|---|---|---|
| JP | 48014/1996 | 2/1996 |
| JP | 2000-94596 | 4/2000 |
| WO | WO98/26021 | 6/1998 |

\* cited by examiner

Primary Examiner—Vivian Chen
(74) Attorney, Agent, or Firm—Colene H. Blank

(57) ABSTRACT

An object of the present invention is to provide a decorative sheet which can be adhered on a surface of an article having a three-dimensional curved surface, even when the operation is conducted in a place of operation at such a temperature as 40 to 60° C., and which does not use vinyl chloride resin. The present invention discloses a decorative sheet having a decorative layer, a protective layer disposed on a surface of the decorative layer, and an adhesive layer formed on the other surface of the decorative layer, wherein the decorative layer comprises a thermoplastic resin, the protective layer is composed of a resin composition comprising an amorphous polyester resin, and both the decorative layer and the protective layer have a glass transition temperature of 20 to 60° C.

20 Claims, 1 Drawing Sheet

US 6,929,846 B2

DECORATIVE SHEET

FIELD OF THE INVENTION

The present invention relates to a decorative sheet, and particularly to a decorative sheet that is adhered to a surface of an article having a three-dimensional curved surface, such as an outside or inside surface of a building and a vending machine in order to decorate the surface of the article.

BACKGROUND OF THE INVENTION

A decorative sheet is a thermoplastic sheet having a decorative image on one surface and an adhesive layer on the other surface and is used for providing decorative images on a surface of an article having a three-dimensional curved surface, such as an outside or inside surface of a building and a vending machine. The decorative sheet is generally adhered on a surface of an article by the following two methods:

(1) A decorative sheet is heated in a place for operation to a given temperature, generally 40 to 60° C. and is adhered on an article under pressuring when the decorative sheet is kept in the given temperature.

(2) A decorative sheet is adhered on an article by a molding method, such as vacuum molding under heating and the like.

Typically, the decorative sheet is made of such a material that either one of the methods or both are applicable. A decorative sheet that has been used for this purpose is usually composed of a vinyl chloride resin as thermoplastic resin sheet. The vinyl chloride resin has good heat moldability and good surface properties, such as wear resistance, chemical resistance and the like. The vinyl chloride resin, however, has recently been avoided and desirously replaced with another resin that can be disposed of without harm or one that can be recycled.

In order to comply with the above requirement, Japanese Kokai Publication No. 48014/1996 proposes a decorative sheet formed from a polyolefin resin, such as polyethylene or polypropylene as thermoplastic resin sheet. Japanese Kokai Publication No. 2000-94596 also proposes a decorative sheet having a protective layer formed from polyester resin thereon.

However, the polyolefin resin disclosed in Japanese Kokai Publication 48014/1996 is crystalline and therefore has a softening temperature too high (more than 100° C.) to conduct a heat adhesion using such a temperature that a handy heating apparatus, such as a dryer can be used in a place for operation.

In addition, the decorative sheet suggested in Japanese Kokai Publication 2000-94596 is designed for the operation (2) mentioned above and therefore is difficult to conduct adhesion in a place of operation by using a handy heating apparatus, such as a dryer. The polyester resin suggested in the this publication has a glass transition temperature of 60 to 85° C. and therefore is not adhered at a temperature less than 60° C. which is generally a heatable temperature by a heating apparatus, such as dryer.

SUMMARY OF THE INVENTION

Briefly, a decorative sheet is provided that can be adhered onto a surface of an article having a three-dimensional curved surface, even when the operation is conducted in a place of operation at such a temperature as 40 to 60° C. Advantageously, the decorative sheet of the present invention does not use vinyl chloride resin.

The present invention provides, a decorative sheet that comprises a decorative layer, a protective layer disposed on a surface of the decorative layer, and an adhesive layer formed on the other surface of the decorative layer, wherein the decorative layer comprises a thermoplastic resin, the protective layer is composed of a resin composition comprising an amorphous polyester resin, and both the decorative layer and the protective layer have a glass transition temperature of 20 to 60° C.

Because the glass transition temperature (Tg) of the decorative layer and the protective layer is adjusted to not more than 60° C., the decorative sheet can easily be adhered even when it is heated in situ for operation at a temperature of generally 40 to 60° C. This improves the in-place processing and film application. In this context, the term "Tg (glass transition point or glass transition temperature)" is defined to be a peak temperature determined by a differential scanning calorimeter.

Generally, if the Tg of the decorative or protective layer is less than 20° C., the decorative sheet has a poorer mar resistance or poorer wear resistance. However, such decorative sheet, that is, one with a Tg of less than 20C, can be used for short-term projects or applications lasting generally not longer than about six months. This decorative sheet is not recommended for longer term applications.

The decorative sheet has an elongation preferably of not less than 30% at 40° C. and of less than 400% at 60° C., when the elongation is determined after the decorative sheet is left for 10 minutes at a given temperature under a tension of 9.8 N/25 mm. Generally, shape compatibility to a curved surface is somewhat decreased when the elongation at 40° C. is less than 30%. If the elongation at 60° C. is more than 400%, the decorative sheet may be deformed or even broken when the decorative sheet is shaped on a curved surface at a relatively high temperature immediately after heating. It is more preferred that the decorative sheet has an elongation of not less than 33% at 40° C. and an elongation of less than 350% at 60° C.

It is also preferred that the decorative sheet has an elongation of 100% to 350%, when the elongation is determined after the decorative sheet is left for 10 minutes at 50° C. under a tension of 9.8 N/25 mm. Generally, shape compatibility to a curved surface is somewhat decreased when the elongation at 50° C. is less than 100%. If the elongation at 50° C. is more than 350%, the decorative sheet may be deformed or even broken when the decorative sheet is shaped on a curved surface at a relatively high temperature immediately after heating. It is more preferred that the decorative sheet has an elongation of 150 to 300% at 50° C. The elongation is determined by placing a test sample at a given temperature condition, applying a tensile strength of 9.8 N/25 mm and keeping it for 10 minutes, followed by determining an elongation.

It is preferred that the protective layer has a thickness larger than the decorative layer, effectively inhibiting breakage of the decorative sheet at a relatively high temperature while keeping high shape compatibility. A thickness ratio (P/D) of the protective layer (P) to the decorative layer (D) is generally within the range of 2 to 15, preferably within the range of 3 to 10. It is also preferred that the protective layer has a thickness of 80 to 500 μm, preferably 120 to 450 μm, more preferably 150 to 350 μm. If it is too thick, shape compatibility to a curved surface is reduced when it is heated and cooled thereafter. If it is too thin, the decorative sheet is more susceptible to breakage and, depending on hardness and resilience of the decorative layer, the decorative sheet may be partially separated from the article to be decorated.

The decorative layer of the decorative sheet is different from the protective layer, in physical properties and materials, generally because function and effect of each layer are different. Accordingly, interfacial delamination between the decorative layer and the protective layer may occur during the application process. It is therefore preferred that a primer layer be inserted between the decorative layer and the protective layer.

DETAILED DESCRIPTION OF THE INVENTION

Decorative Sheet

Figure 1:
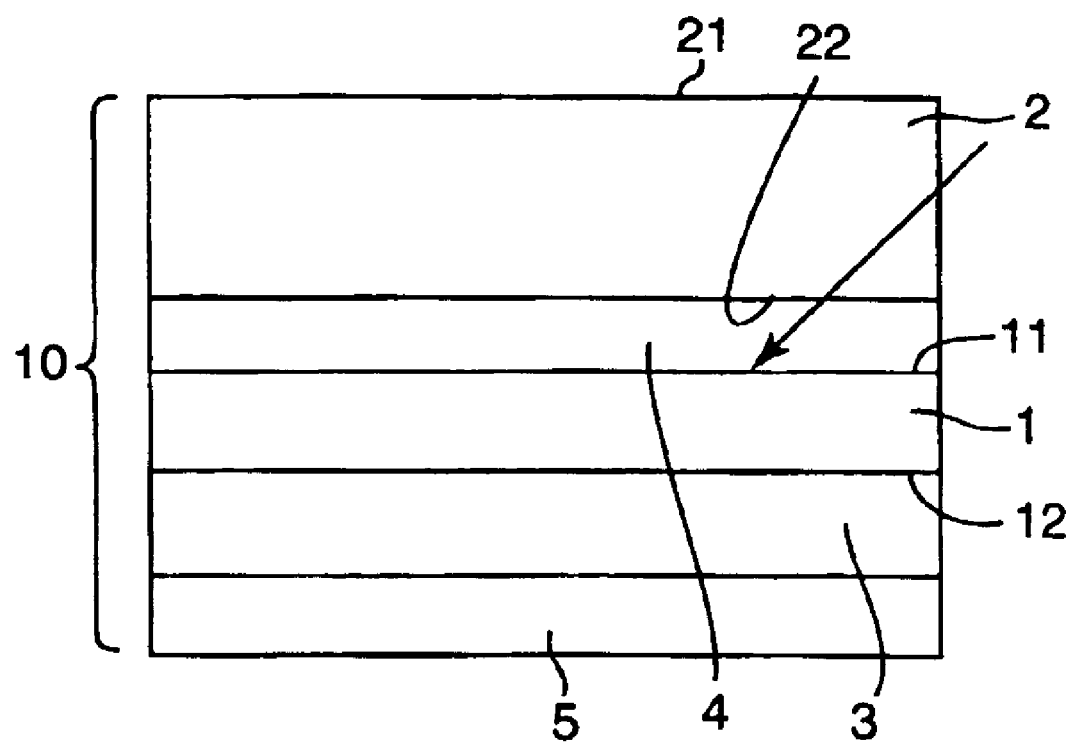
FIG. 1 is a schematic cross sectional view of the decorative sheet of the present invention.

One example of the decorative sheet of the present invention, as shown in FIG. 1, is composed of a decorative layer (1), a protective layer (2) having a back layer (22), contacted on the surface (11) of the decorative layer, and a adhesive layer (3) contacted on the back surface (12) of the decorative layer (1). The decorative layer (1) may be formed from a resin layer having a graphic printed thereon, a resin layer containing colorant or a laminate containing such resin layer. In an embodiment illustrated in FIG. 1, a primer layer (4) is present between the decorative layer (1) and the protective layer, for enhancing adhesion power, although primer layer (4) is an optional layer.

The adhesive layer (3) is formed from a coating containing an adhesive polymer and a crosslinking agent, similar to a conventional adhesive sheet. On an adhesive surface of the adhesive layer, a release liner (5) is generally disposed. The liner can have small roughness on a release surface, which controls adhesive power by transferring the roughness to the adhesive layer from the release layer. It is preferred that the small roughness would disappear by a plastic deformation of the adhesive layer after finishing adhering, so that the distinguishness of the decorative sheet would not be damaged.

Protective Layer

The protective layer is formed from an amorphous polyester resin composition. The amorphous polyester resin has good heat extension ability that is advantageous for enhancing shape compatibility to curved surface in hand adhering operation of the decorative sheet. The amorphous polyester resin has high transparency, less whitening when extended and exhibits good solvent resistance.

Although it is preferred that the protective layer has high transparency, it may be translucent or colored transparency for enhancing design properties of the decorative sheet. The protective layer generally has a light transmittance of not less than 65%, preferably not less than 70%. In the present specification, the "light transmittance" is determined by a measuring method of light transmittance according to JIS K 7105.

An elongation of the protective layer partially governs the elongation of the decorative sheet of the present invention. It is therefore preferred that the protective layer has an elongation of not less than 30% at 40° C. and of less than 400% at 60° C., when the elongation is determined after the decorative sheet is left for 10 minutes at a given temperature under a tension of 9.8 N/25 mm. Generally, shape compatibility to a curved surface is somewhat decreased when the elongation at 40° C. is less than 30%. If the elongation at 60° C. is more than 400%, the decorative sheet may be deformed or even broken when the decorative sheet is shaped on a curved surface at a relatively high temperature immediately after heating. It is more preferred that the decorative sheet has an elongation of not less than 33% at 40° C. and an elongation of less than 350% at 60° C.

It is also preferred that the protective layer has an elongation of 100 to 350%, when the elongation is determined after the decorative sheet is left for 10 minutes at 50° C. under a tension of 9.8 N/25 mm. Generally, shape compatibility to a curved surface is somewhat decreased when the elongation at 50° C. is less than 100%. If the elongation at 50° C. is more than 350%, the decorative sheet may be deformed or even broken when the decorative sheet is shaped on a curved surface at a relatively high temperature immediately after heating. It is more preferred that the protective layer has an elongation of 150 to 300% at 50° C.

The protective layer may be subjected to techniques of embossing or calendaring to enhance design properties, as long as it does not adversely affect on the technical effects of the present invention. In this context, the embossing gives some protrusions on the surface and a combination of the protrusions and the portions around the protrusion creates three-dimensional designed appearance. The calendaring makes the protective layer smooth to reduce surface roughness, which imparts specular gloss appearance.

Polyester Resin Composition

The protective layer is formed from a resin composition that contains a thermoplastic amorphous polyester resin, wherein the resin composition has a glass transition temperature of 20 to 60° C. and excellent transparency.

The amorphous polyester resin composition may contain (i) a phthalate type polyester resin, such as polyethylene terephthalate, polybutylene terephthalate, polyethylene naphthalate and the like; and (ii) a polyether compound that is at least partially soluble with the phthalate type polyester resin. In this combination, the phthalate type polyester resin behaves as a thermoplastic resin and the polyether compound behaves as a plasticizer or softening agent. The combination has a large elongation even at a relatively low temperature and exhibits good toughness even at relatively high temperature. The amorphous resin composition provides shape compatibility to a curved surface when the decorative sheet is adhered by hand at a temperature of 40 to 60° C.

The phthalate type polyester resin is a polyester that has in one molecule both (a) a repeating unit derived from phthalic acid or naphthalic acid, such as terephthalic acid, isophthalic acid or naphthalic acid, and (b) a repeating unit derived from diol. The polyester can be prepared by reacting dicarboxylic acid (e.g. phthalic acid or phthalic anhydride) and diol, such as by condensation polymerization.

The diols can be a mixture of (b-1) a linear aliphatic diol, such as ethylene glycol, 1,4-butane diol, 1,6-hexane diol, caprolactone diol and the like; and (b-2) an alicyclic diol, such as 1,4-cyclohexane methandiol, cyclohexane diol and the like. The amorphous polyester can preferably be prepared from the diol mixture as mentioned above. The amorphous polyester resin can easily give shape compatibility to a curved surface when the decorative sheet is adhered by hand at a temperature of 40 to 60° C.

It is preferred for the amorphous polyester resin of the present invention that a weight ratio of diols i.e. (b-1):(b-2), is 10:60 to 80:20.

The dicarboxylic acid or its derivative can be those other than phthalic acid. The amorphous polyester resin may preferably has a number average molecular weight of at least 10,000, more preferably of 15,000 to 1,000,000.

The amorphous polyester resin is commercially available, including Easter PETG polyester, available from Eastman Kodak Co. and the like.

The polyether compound can be an alkylene glycol type ether compound which contains a repeating unit of alkylene glycol having 2 to 6 carbon atoms. The alkylene glycol type ether compound includes 1) a polyalkylene glycol diether obtained by alkyl-etherifying both end of a polyalkylene glycol (e.g. polyethylene glycol or tetramethylene glycol), or 2) a polyester ether having both alkylene glycol unit and dicarboxylic acid unit. The alkyl group for etherifying preferably includes a lower alkyl group (having not more than 3 carbon atoms), such as methyl group, ethyl group and propyl group. Examples of dicarboxylic acids for the 2) are an aromatic dicarboxylic acid, such as terephthalic acid, isophthalic acid, phthalic acid, 2,6-nephthalene dicarboxylic acid, 1,5-naphthalene dicarboxylic acid and the like.

The polyalkylene glycol unit of the polyether compound can preferably be polyethylene glycol unit, which shows a large elongation even at a relatively low temperature and has good toughness even at a relatively high temperature.

The polyether compound generally has a number average molecular weight of 400 to 6,000, preferably 450 to 3,000, more preferably 500 to 3,000. Molecular weights more than 6,000 reduce an elongation of the resin composition at a low temperature and those less than 400 reduce a toughness of the resin composition at a high temperature.

The polyether compound may generally have a melting point of 150 to 250° C., a melt viscosity of 500 to 30,000 poise when determined at a shear rate of 100 sec$^{-1}$ and a temperature of 250° C. Within the above range, the polyester resin composition can be formed into film by a conventional film-forming method, such as extruding method to easily obtain polyester film used for the protective layer. The polyether compound preferably has a Tg (peak temperature of tan δ) of −50 to 30° C., more preferably −40 to 25° C., most preferably −30 to 20° C.

The polyether compound can be commercially available under tradenames, such as Butycel, Butycenol, Kyowanol, and the like.

The polyester resin composition may contain another additive, in addition to the essential components (i.e. thermoplastic polyester resin and polyether compound), as long as it does not damage the transparency and heat extending ability of the present invention. The other additive includes colorant (e.g. dye, pigment etc.), plasticizer, softening agent, surfactant, filler (including glass beads or ceramic beads), crosslinking agent, frame retardant, ultra-violet absorber, oxidation stabilizer, anti-fungus agent or the like. The additive may preferably contain in an amount of not more than 20 parts by mass based on 100 parts by mass of the essential components.

Decorative Layer

The decorative layer of the present invention may be either (1) a resin layer containing colorant and thermoplastic resin, or (2) a resin layer and a printing layer or portion fixedly disposed on the resin layer. The printing step may be conducted by electrostatic printing, gravure printing, silk printing, ink-jet printing and the like, and the resin layer can be one that has high affinity with ink or toner for printing. The opposite surface of the decorative layer may have a primer layer to enhance adhesive power with the adhesive layer.

The decorative layer may be prepared by preparing a paint containing thermoplastic resin as main component and coating and solidifying (drying or curing) it. Coating can be conducted by a notch bar, a round bar or the like. In addition, the decorative layer may be formed by melt-extruding a material containing a film-forming polymer.

The thermoplastic resin for the decorative layer may include polyurethane, acrylic resin, polyester, silicone resin, ionomer, ethylene-vinyl acetate copolymer or the like; or a mixture thereof. For example, a mixture of polymethyl methacrylate copolymer and ethyl-vinyl acetate copolymer enhances both toughness and elongation with keeping balance. The thermoplastic resin may preferably have a light transmittance of not less than 60%, more preferably not less than 70%.

The decorative layer may further contain an additive, in addition to the thermoplastic resin and optional colorant. The additive may include metal gloss particle, plasticizer, softening agent, surfactant, filler (including glass beads or ceramic beads), crosslinking agent, frame retardant, ultraviolet absorber, oxidation stabilizer, anti-fungus agent or the like. The decorative layer preferably contain a plasticizer to control elongation within a desired range. The additive may preferably contain in an amount of not more than 30 parts by mass based on 100 parts by mass of the thermoplastic resin.

The decorative layer may preferably have a desired elongation for easy operation of adhering. The decorative layer may also has a thickness of 10 to 400 µm, preferably 15 to 200 µm.

Adhesive Layer

The adhesive layer generally contains adhesive polymer. The adhesive polymer may include acrylic polymer, silicone polymer, α-polyolefin polymer, rubber polymer (e.g. synthetic rubber, such as SBS etc. or natural rubber), polyurethane polymer or the like. The adhesive polymer may be used alone or in combination. The adhesive polymer may be prepared by polymerizing a monomer mixture containing suitable monomers. Polymerization can be conducted by a conventional method, such as solution polymerization, bulk polymerization, emulsion polymerization or the like.

The acrylic adhesive polymer may generally be prepared by polymerizing a monomer mixture of (A) an alkyl acrylate having 4 to 8 carbon atoms and (B) an (meth)acrylic acid monomer having a carboxylic group in a molecule. Another monomer to be copolymerized with the above two monomers, such as (meth)acrylic monomer and a vinyl-group containing monomer can also be used.

Examples of the monomer (A) are n-butyl acrylate, isobutyl acrylate, isooctyl acrylate, 2-ethylhexyl acrylate, and the like. Examples of the monomer (B) are (meth)acrylic acid. Examples of the other monomers are phenoxyethyl acrylate, phenoxypropyl acrylate, 2-hydroxyethyl (meth) acrylate, 2-hydroxypropyl (meth)acrylate, 2-hydroxymethyl (meth)acrylate, hydroxy-3-phenoxypropyl acrylate, glycidyl (meth)acrylate, acryloyl benzophenone and the like.

The adhesive polymer may generally be crosslinked. The crosslinking may be conducted by reacting a crosslinking agent and polymer. The crosslinking agent is not specifically limited, but includes isocyanate compound, epoxy compound, bis-amide compound and the like. The crosslinking agent may be contained in an amount of 0.1 to 5 parts by mass, based on 100 parts by mass of the adhesive polymer.

The adhesive layer may contain resilient microbaloon or crystalline polymer, as long as they do not adversely affect on the technical effects of the present invention. The resin which has re-adhering ability may be used. The adhesive layer may have a thickness of 5 to 200 µm, preferably 10 to 100 µm, as long as the purpose of the present invention can be attained.

Primer Layer

The primer layer may be fixedly disposed either on a surface of the decorative layer or on a backside of the protective layer, and then adhered to another layer to be adhered. The primer layer may be formed from a primer polymer which is selected from a polymer having affinity with both the decorative layer and the protective layer. The primer polymer may be vinyl chloride-vinyl acetate copolymer, urethane elastomer or aminoethyled polymer, in case where the decorative layer contains acrylic resin as thermoplastic resin. The presence of the primer layer may increase adhesion between the protective layer and the decorative layer.

The aminoethyled polymer is a polymer into which a primary amine group (—NH$_2$) is introduced by a method using ethyleneimine. It is generally referred "aminoethyling" that a primary amine group is introduced by ring-opening ethylene imine and adding. Accordingly, in the present specification, a polymer into which a primary amine group is introduced by the above method is referred as an aminoethyled polymer or aminoethyled resin. In addition, the urethane elastomer can be an elastomer formed from a polyurethane obtained by polymerizing a starting material containing polyol and diisocyanate.

The primer layer may have a thickness of 0.1 to 30 μm, preferably 0.5 to 10 μm. Also, the primer layer may have a light transmittance of not less than 80%, preferably not less than 85%.

The primer layer may be formed by coating a solution containing the primer polymer on the decorative layer (or protective layer, and solidifying by curing or drying. Coating may be conducted by a coater, such as a gravure coater, a bar coater, a naf coater, a roll coater, a die coater or the like.

Method of Forming the Decorative Sheet

The polyester resin composition for the protective layer is formed into a polyester film by a conventional film-forming method. The film-forming method of the polyester resin may include T-die method, inflation method, calendar method, cast method or the like.

The polyester film used for the protective layer may be prepared as follow. A amorphous copolyester resin is mixed with a polyether compound in a given amount ratio and, if necessary, dried at 100 to 150° C. for several hours to 10 hours to obtain a starting mixture. The starting mixture is put into an extruder and extruded at a desired temperature (generally 180 to 280° C.) and a desired die temperature (generally 180 to 260° C.) and then quenched by a casting roller to form a polyester film. The polyester film is a non-extended film, but if necessary, it may be monoaxially or biaxially oriented.

A mixing ratio of the amorphous copolyester resin and the polyether compound may generally be within the range of 70:30 to 99:1, preferably within the range of 80:20 to 97:3, more preferably 85:15 to 95:5. If the amorphous copolyester resin is too much, the resin composition reduces the elongation at a low temperature. It the polyether is too much, the resin composition does not have enough toughness at a high temperature.

The resulting polyester film as the protective layer is contacted with the surface of the decorative layer which is separately prepared and put together. The decorative layer is prepared as mentioned above and the primer layer is disposed thereon.

Lastly, an adhesive layer is fixedly disposed on the backside of the decorative layer to form a decorative sheet of the present invention. The adhesive layer may be formed either by preparing a paint containing adhesive polymer and then coating directly on the backside of the decorative layer, followed by drying, or by coating the paint on a release liner and contacting it with the backside of the decorative layer. A support layer may be inserted between the decorative layer and the adhesive layer. The support may be stretchable polymer film, porous film (e.g. non-woven fabric or woven fabric), metal film containing mesh, or the like.

EXAMPLES

The present invention will be explained with reference to the following Examples.

Example

In this Example, a decorative sheet as shown in FIG. 1 was prepared. A protective layer was prepared as follow. An amorphous polyester resin and a polyether compound were put into an extruder and extruded into an amorphous polyester film having a thickness of 200 μm, which was used as protective layer.

The amorphous polyester resin was prepared by polymerizing a monomer mixture of (a) terephthalic acid, (b-1) ethylene glycol, and (b-2) 1,4-butane diol in an amount ratio of (a):(b-1):(b-2) being 66:16:18 (mass ratio). The polyether compound was a polyethylene glycol dimethyl ether having an average molecular weight of about 430. The amorphous polyester resin was contained in the resin composition in an amount of 92% by mass.

The protective layer obtained above had a Tg of 36° C. The Tg of this Example was determined using a differential scanning calorimeter DSC available from Perkin Elmer Co. by raising temperature at a rate of 10° C./min within a temperature range of –50° C. to 160° C. Its Tg was specified from a peak temperature of the chart obtained above.

Next, a decorative layer was prepared using a acrylic resin (methyl methacrylate copolymer having Tg of 50° C.) as thermoplastic resin as follow. Hundred parts by mass of the thermoplastic resin was mixed with 20 parts by mass of an adipic acid-polyester as plasticizer and a pigment as colorant to form a film material. The colorant was dispersed in the plasticizer before adding the resin mixture. The film material was formed into a polymer film by an extruding method to use it as a decorative layer. The decorative layer had a thickness of 30 μm to ensure sufficient opacifying power.

The decorative layer was coated to form a primer layer formed from vinyl chloride-vinyl acetate copolymer by gravure coating to form the decorative layer. The decorative layer with the primer layer and the protective layer were laminated and heat pressured by a heat roller to form a decorative sheet of the present invention.

Comparative Example

A decorative sheet was prepared as generally described in Example, with the exception that both decorative layer and protective layer were prepared from crystalline polyolefin film.

Evaluation of Decorative Sheet (1) Elongation

The decorative sheet was cut into a sample of 25 mm width ×100 mm lengthen. The sample was oriented along the direction of lengthen by an orientation machine using 1 Kg weight (9.8 N/25 mm) and left at a given temperature for 10 minutes, followed by determining a value of elongation. The results are shown in Table 1.

TABLE 1

| | Elongation(%) | |
|---|---|---|
| Temperature | Example | Comparative Example |
| 23° C. (Ambient temperature) | 0 | 0 |
| 30° C. | 3 | 0 |
| 40° C. | 35 | 0 |
| 50° C. | 225 | 0 |
| 60° C. | 320 | 0 |
| 70° C. | —* | 1 |
| 80° C. | — | 1 |
| 90° C. | — | 1 |
| 100° C. | — | 2 |
| 110° C. | — | 3 |
| 120° C. | — | 5 |
| 130° C. | — | 9 |
| 140° C. | — | 30 |
| 150° C. | — | >200* |

*film broke

The decorative sheets of Comparative Example did not show elongation at less than 130° C., because the resin for the protective layer and decorative layer had high crystallinity. On the other hand, the decorative sheets of Example was suitably softened at temperatures of 40 to 60° C. which is a temperature of adhering operation. This shows that the decorative sheet can be extended by a hand.

Operability in Place of Operation

The decorative sheet of Example was heated and softened by a drier to adhere on a three-dimensional curved surface. For comparison, a Dinoc® commercially available for a decorative sheet using a vinyl chloride protective layer was used and the same operation was conducted. Operability in place of operation was compared with each other. As the result, it was found that the operability in place of operation did not have any difference therebetween.

I claim:

1. A decorative sheet comprising a decorative layer, a protective layer disposed on a surface of the decorative layer, and an adhesive layer formed on the other surface of the decorative layer,
    wherein the decorative layer comprises a thermoplastic resin, the protective layer is composed of a resin composition comprising an amorphous polyester resin, both the decorative layer and the protective layer have a glass transition temperature of 20 to 60° C., and
    the decorative sheet has an elongation of not less than 30% at 40° C. and of less than 400% at 60° C., the elongation being determined after the decorative sheet is left for 10 minutes at a given temperature under a tension of 9.8 N/25 mm.

2. The decorative sheet according to claim 1, wherein the decorative sheet has an elongation of 100 to 350%, the elongation being determined after the decorative sheet is left for 10 minutes at 50° C. under a tension of 9.8 N/25 mm.

3. The decorative sheet according to claim 1, wherein the protective layer has a thickness larger than the decorative layer.

4. The decorative sheet according to claim 3, wherein the protective layer has a thickness of 80 to 500 µm.

5. The decorative sheet according to claim 1, wherein between the decorative layer and the protective layer is present a primer layer for enhancing an adhesion of the layers.

6. The decorative sheet according to claim 1, wherein the decorative layer is adhered to a surface of an article having a three-dimensional curved surface.

7. The decorative sheet according to claim 6, wherein the article comprises an outside or inside surface of a building or a vending machine.

8. The decorative sheet according to claim 1, wherein the decorative layer further comprises a colorant.

9. The decorative sheet according to claim 1, wherein the decorative layer further comprises a printing layer thereon.

10. The decorative sheet according to claim 1, further comprising a release liner on the adhesive layer.

11. The decorative sheet according to claim 1, wherein the decorative sheet does not contain vinyl chloride resin.

12. The decorative sheet according to claim 1, wherein the protective layer has a light transmittance of not less than 65%.

13. The decorative sheet according to claim 1, wherein the protective layer has an embossed surface.

14. The decorative sheet according to claim 1, wherein the amorphous polyester resin comprises (a) a first polyester having both (i) a repeating unit derived from phthalic acid or naphthalic acid, and (ii) a repeating unit derived from one or more diols; and (b) a polyether compound that is at least partially soluble in the first polyester.

15. The decorative sheet according to claim 14, wherein the one or more diols comprise (i) a linear aliphatic diol selected from the group consisting of ethylene glycol, 1,4-butane diol, 1,6-hexane diol, and caprolactone diol; and (ii) an alicyclic diol selected from the group consisting of 1,4-cyclohexane methandiol and cyclohexane diol.

16. A decorative sheet comprising a decorative layer, a protective layer disposed on a surface of the decorative layer, and an adhesive layer formed on the other surface of the decorative layer,
    wherein the decorative layer comprises a thermoplastic resin, the protective layer is composed of a resin composition comprising an amorphous polyester resin, and
    both the decorative layer and the protective layer have a glass transition temperature of 20 to 60° C.;
    wherein the decorative sheet does not contain vinyl chloride resin, and the amorphous polyester resin comprises (a) a first polyester having both (i) a repeating unit derived from phthalic acid or naphthalic acid, and (ii) a repeating unit derived from one or more diols; and (b) a polyether compound that is at least partially soluble in the first polyester.

17. The decorative sheet according to claim 16, wherein the one or more diols comprise (i) a linear aliphatic diol selected from the group consisting of ethylene glycol, 1,4-butane diol, 1,6-hexane diol, and caprolactone diol; and (ii) an alicyclic diol selected from the group consisting of 1,4-cyclohexane methandiol and cyclohexane diol.

18. The decorative sheet according to claim 16, wherein the decorative layer is adhered to a surface of an article.

19. A decorative sheet comprising a decorative layer, a protective layer disposed on a surface of the decorative layer, and an adhesive layer formed on the other surface of the decorative layer, and a release liner on the adhesive layer,
    wherein the decorative layer comprises a thermoplastic resin, the protective layer is composed of a resin composition comprising an amorphous polyester resin,
    both the decorative layer and the protective layer have a glass transition temperature of 20 to 60° C., and
    the decorative sheet has an elongation of not less than 30% at 40° C. and of less than 400% at 60° C., the elongation being determined after the decorative sheet is left for 10 minutes at a given temperature under a tension of 9.8 N/25 mm.

20. The decorative sheet according to claim 19, wherein the amorphous polyester resin comprises (a) a first polyester having both (i) a repeating unit derived from phthalic acid or naphtbalic acid, and (ii) a repeating unit derived from one or more dials; and (b) a polyether compound that is at least partially soluble in the first polyester.

* * * * *

UNITED STATES PATENT AND TRADEMARK OFFICE
CERTIFICATE OF CORRECTION

PATENT NO. : 6,929,846 B2
DATED : August 16, 2005
INVENTOR(S) : Kamiyama, Kehju

It is certified that error appears in the above-identified patent and that said Letters Patent is hereby corrected as shown below:

Column 2,
Line 1, after "provides" delete ",".

Column 12,
Line 1, delete "naphtbalic" and insert -- naphthalic --.
Line 2, delete "dials" and insert -- diols --.

Signed and Sealed this

Third Day of January, 2006

JON W. DUDAS
*Director of the United States Patent and Trademark Office*